(12) United States Patent
Ozzie et al.

(10) Patent No.: US 8,626,136 B2
(45) Date of Patent: Jan. 7, 2014

(54) ARCHITECTURE FOR USER- AND CONTEXT-SPECIFIC PREFETCHING AND CACHING OF INFORMATION ON PORTABLE DEVICES

(75) Inventors: Raymond E. Ozzie, Manchester, MA (US); Eric J. Horvitz, Kirkland, WA (US); William H. Gates, III, Medina, WA (US); Joshua T. Goodman, Redmond, WA (US); Susan T. Dumais, Kirkland, WA (US); Gary W. Flake, Bellevue, WA (US); Trenholme J. Griffin, Bainbridge Island, WA (US); Xuedong D. Huang, Bellevue, WA (US); Oliver Hurst-Hiller, New York, NY (US); Christopher A Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1371 days.

(21) Appl. No.: 11/427,755

(22) Filed: Jun. 29, 2006

(65) Prior Publication Data

US 2008/0005695 A1    Jan. 3, 2008

(51) Int. Cl.
- *H04M 3/42* (2006.01)
- *H04L 29/06* (2006.01)
- *H04W 74/00* (2009.01)
- *G06F 15/16* (2006.01)
- *G06F 3/033* (2013.01)

(52) U.S. Cl.
USPC ............... 455/414.2; 455/414.3; 455/456.3; 709/217; 709/227; 715/811

(58) Field of Classification Search
USPC ............ 455/414.2, 414.3, 456.3; 707/3, 102; 709/217, 227; 715/811
See application file for complete search history.

(56) References Cited

U.S. PATENT DOCUMENTS

| | | | |
|---|---|---|---|
| 5,493,692 | A | 2/1996 | Theimer et al. |
| 5,544,321 | A | 8/1996 | Theimer et al. |
| 5,555,376 | A | 9/1996 | Theimer et al. |
| 5,603,054 | A | 2/1997 | Theimer et al. |

(Continued)

FOREIGN PATENT DOCUMENTS

WO    9800787    1/1998

OTHER PUBLICATIONS

OA dated Mar. 27, 2009 for U.S. Appl. No. 11/427,763, 33 pages.

(Continued)

*Primary Examiner* — Ariel Balaoing
(74) *Attorney, Agent, or Firm* — Lee & Hayes, PLLC

(57) ABSTRACT

Content management architecture for a portable wireless device. Caching and fetching techniques are provided to improve content handling for portable devices such as cellular telephones and portable computers. A search component automatically performs searches as a background process, and potentially desired content is received and cached by a content storing component to be available in the future when and if needed, mitigating latency associated with slow download speeds, refresh rates, and other system and/or network impediments. Content from background search results can be trickled into the device as part of the background process so as not to burden system resources for other processes. As part of memory management, aged and/or low priority or low interest content can be selectively removed or archived to increase available cache or memory space, as well as to maintain relevant content within the device. A presentation component facilitates presentation of the pre-stored content.

20 Claims, 17 Drawing Sheets

(56) References Cited

U.S. PATENT DOCUMENTS

| | | | |
|---|---|---|---|
| 5,611,050 A | 3/1997 | Theimer et al. | |
| 5,812,865 A | 9/1998 | Theimer et al. | |
| 6,098,064 A * | 8/2000 | Pirolli et al. | 1/1 |
| 6,385,602 B1 * | 5/2002 | Tso et al. | 707/3 |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,742,033 B1 * | 5/2004 | Smith et al. | 709/224 |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 6,968,333 B2 | 11/2005 | Abbott et al. | |
| 7,072,670 B2 * | 7/2006 | Sato et al. | 455/456.1 |
| 7,072,886 B2 | 7/2006 | Salmenkaita et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0046401 A1 | 3/2003 | Abbott et al. | |
| 2003/0051101 A1 * | 3/2003 | Burger et al. | 711/137 |
| 2003/0126232 A1 | 7/2003 | Mogul et al. | |
| 2003/0154476 A1 | 8/2003 | Abbott, III et al. | |
| 2004/0034803 A1 * | 2/2004 | Hamilton | 713/300 |
| 2004/0068724 A1 * | 4/2004 | Gardner et al. | 717/173 |
| 2004/0168121 A1 * | 8/2004 | Matz | 715/513 |
| 2005/0034078 A1 | 2/2005 | Abbott et al. | |
| 2005/0129042 A1 * | 6/2005 | Muhonen et al. | 370/412 |
| 2005/0138143 A1 * | 6/2005 | Thompson | 709/218 |
| 2005/0210024 A1 * | 9/2005 | Hurst-Hiller et al. | 707/5 |
| 2006/0135179 A1 * | 6/2006 | Aaltonen | 455/456.3 |
| 2006/0277271 A1 * | 12/2006 | Morse et al. | 709/217 |
| 2006/0277308 A1 | 12/2006 | Morse et al. | |
| 2007/0055660 A1 * | 3/2007 | Anderson | 707/4 |
| 2007/0060109 A1 * | 3/2007 | Ramer et al. | 455/414.1 |
| 2007/0162502 A1 | 7/2007 | Thomas et al. | |
| 2007/0184820 A1 * | 8/2007 | Marshall | 455/414.3 |
| 2007/0198485 A1 | 8/2007 | Ramer et al. | |

OTHER PUBLICATIONS

Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, In Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38—No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings Usenix Symposium on Mobile and Location Independent Computing, Aug. 1993, 9 pages.
Mike Spreitzer, et al., Architectural Considerations for Scalable, Secure, Mobile Computing with Location Information, in the 14th International Conference on Distributed Computing Systems, Jun. 1994, pp. 29-38.
Mike Spreitzer et al., Scalable, Secure, Mobile Computing with Location Information, Communications of the ACM, Jul. 1993, 1 page, vol. 36—No. 7.
Roy Want, et al., The Active Badge Location System, ACM Transactions on Information Systems, Jan. 1992, pp. 91-102, vol. 10—No. 1.
Mark Weiser, Some Computer Science Issues in Ubiquitous Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of the First International Conference on the Practical Application of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of the First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, et al., Disseminationg Active Map Information to Mobile Hosts, IEEE Network, 1994, pp. 22-32, vol. 8—No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May 1998, 48 pages.
Mark Weiser, The Computer for the 21st Century, Scientific American, Sep. 1991, 8 pages.
T. Joachims, Text categorization with support vector machines: learning with many relevant features, Machine Learning, European Conference on Machine Learning, Apr. 21, 1998, pp. 137-142.
International Search Report dated Sep. 29, 2003 for PCT Application Serial No. 00/20685, 3 Pages.
Robert M. Losee, Jr., Minimizing information overload: the ranking of electronic messages, Journal of Information Science 15, Elsevier Science Publishers B.V., 1989, pp. 179-189.
OA dated Aug. 27, 2008 for U.S. Appl. No. 11/427,763, 46 pages.

* cited by examiner

ARCHITECTURE FOR USER- AND CONTEXT-SPECIFIC PREFETCHING AND CACHING OF INFORMATION ON PORTABLE DEVICES

CROSS REFERENCE TO RELATED APPLICATIONS

This application is related to co-pending U.S. patent application Ser. No. 11/427,763 entitled "DESKTOP SEARCH FROM MOBILE DEVICE" (Ozzie, et al.) filed of even date, the entirety of which is incorporated herein by reference.

BACKGROUND

The Internet provides unprecedented access to an ever-increasing number of potential customers ranging from businesses to individuals. For example, Internet-gaming such as casino-type games and computer games have skyrocketed to a multi-billion dollar industry, thereby providing a form of leisure activity for millions of users while also providing a boon to companies involved in such an industry by providing access to new sources of advertising revenue.

Money expended for online advertising for fixed as well as portable wireless device (e.g., portable computers) in the United States alone, is in the billions of dollars per year, and continues to increase with no end in sight. Additionally, rapid advances in cellular networks and related products have followed suit making cell phones and cell-capable devices just as pervasive as IP-based devices, if not more pervasive than such computing devices, providing access to yet even more people and sources of advertising revenue.

A more effective solution for reaching a greater number of individuals is by communicating "one-on-one" with each potential customer and targeting each individual based on his or her preferences, tastes, buying habits, wants, needs, and so on, to offer the most effect means for making a sale. Accordingly, the Internet, cellular networks, and their myriad of websites and millions of users provide a convenient and more effective mechanism for presenting advertisements in a one-on-one fashion.

Portable wireless devices such as cellular telephones and portable computing devices provide mechanisms for reaching millions of potential customers. However, portable devices such as cell phones are designed with a compromise in battery power and computing power. Thus, the computing capabilities of cell phones, for example, are more limited than desktop computers, where battery power is not an issue. Additionally, portable devices may be disconnected from wireless or wired communications (or untethered) for variable periods of time. At times, the devices may be able to communicate at low bandwidth, or may not have access to the resources of a private corporate network. Accordingly, it is desirable to find new data management mechanisms (e.g., affiliated with memory management) for use in portable wireless devices that facilitate approaching the user experience normally associated with desktop systems for accessing, processing, interacting and presenting information.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture enhances user experience in portable wireless devices (e.g., cell phones and portable computers) by prefetching information and content into the devices via searching as a background process thereby making available the information and content before presentation thereof is expected.

The invention takes into consideration that user state and overall user context may change at a much higher rate, and arguably, magnitude, within the context of a portable device versus desktop computer. Additionally, portable wireless devices typically have less hardware and/or software capability as compared to desktop computing devices related to, for example, available network communications bandwidth (wireless versus wired), memory capability, processing capability, and display real estate.

The subject innovation facilitates content (or information) management in portable wireless devices such as cellular telephones and portable computers by utilizing caching and fetching techniques to improve content handling. More specifically, searches are automatically performed (e.g., continuously) as a background process, and potentially desired content is received and cached to be available when and if needed. This mitigates latency associated with slow download speeds, refresh rates, and other system and/or network impediments such as less robust device hardware and/or software.

Content from background search results can be downloaded based on the capabilities (e.g., hardware and/or software) of the portable device. For example, if it is determined that the system processing capability is limited, content from search results can be trickled into (or downloaded to) the device as part of the background process so as not to burden system resources being utilized for other processes.

With respect to memory management, aged and/or low priority or low interest content can be selectively removed or archived to increase available cache or memory space, as well as to maintain relevant content within the device.

Additionally, new advertising models can be provided. When used in combination with one advertising model, for example, a merchant can offer a free cell phone provided that the user allows pre-installed machinery to receive and display content and advertisements approved by the merchant. Alternately, or in combination therewith, advertisements can be cached on the device so as to be later dynamically displayed as a function of various triggers (e.g., current device location, user state/context, user receptiveness to particular advertisements, and so on). User interaction with the cached content can be logged and cached for making downstream decisions about the display of content to the user locally and the prefetching of additional information into the computers cache when bandwidth becomes available. The logged behaviors or summaries thereof can, with prior user permission or by real-time request of the user, be uploaded to servers for analysis. Such analysis can be used in decision making about the best next content to download to device.

In support thereof, the invention disclosed and claimed herein, in one aspect thereof, comprises a computer-implemented system that facilitates content presentation in a portable wireless device. The system includes a computer-executable search component that performs an automated search as a background process, a computer-executable content storing component that stores content corresponding to the automated search for future access, and a computer-executable presentation component that presents a subset of the pre-stored content as a function of at least one of user state, user content, and user preference.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
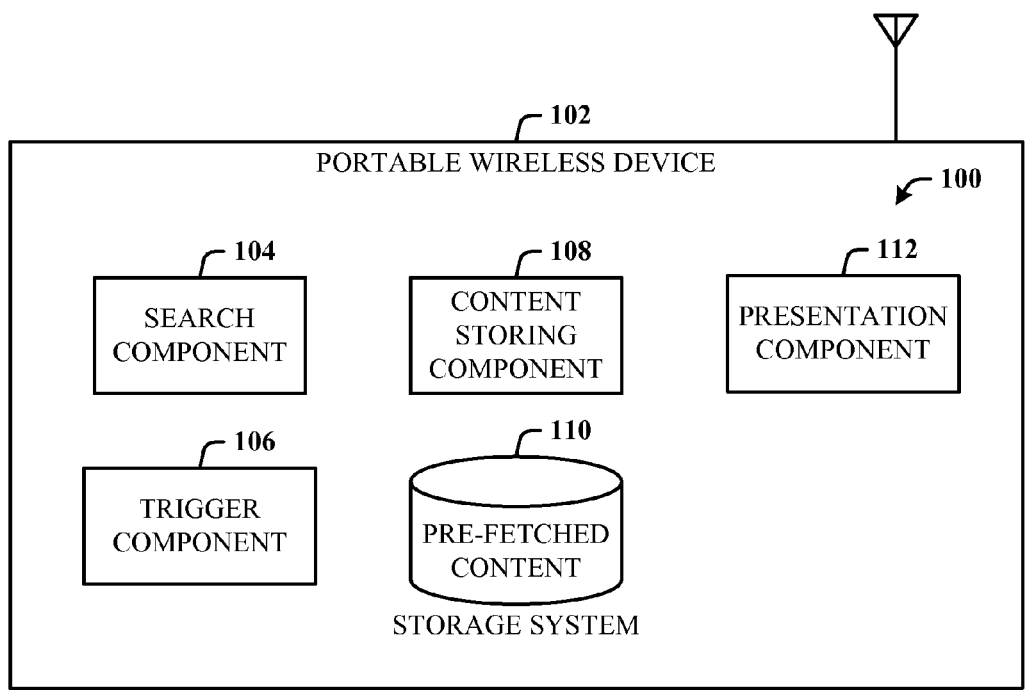
FIG. 1 illustrates a computer-implemented system that facilitates content management in a portable wireless device in accordance with an innovative aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Referring initially to the drawings, FIG. 1 illustrates a computer-implemented system 100 that facilitates content management in a portable wireless device 102 in accordance with an innovative aspect. A computer-executable search component 104 is provided that performs an automated search as a background process. A trigger component 106 facilitates triggering or initiation of the search process by any number of data or events. For example, user preferences can be configured to automatically search for information based user interaction with the device, such as associated with powering the device or pressing a button on a keypad. Other events or data can be associated with user context, user state, a change in user context or user state, environmental data, temporal data, geolocation data (e.g. global positioning system), and so on.

The system 100 of the device 102 can also include a computer-executable content storing component 108 that facilitates storage (e.g., pre-stored before presentation, if presented at all) and access of the content corresponding to the automated search, via a storage system 110. It is to be understood that the content can be stored for access and presentation at some future time, or it may not be accessed and presented at all. In the latter case, and in one implementation, eventually it can be aged out and archived or discarded altogether. A computer-executable presentation component 112 of the system 100 facilitates presentation (e.g., visually and/or audibly) of some or all of the pre-stored (or pre-fetched) content as a function of triggering events or data related to at least one of user state, user content, and user preference, for example.

The searches in accordance with various embodiments described herein can be performed as Internet search as well as searches within an intranet (e.g., a search of information stored on a remote desktop computer or within a corporate network). Mobile devices are typically present on users (or proximate thereto) during most hours of the day. Accordingly, such devices provide a very convenient mechanism to deliver relevant or desired content to a user in an immediate fashion. Prefetching and/or pre-caching information as a function of user preference, state, context or other metrics enhances a user experience and offsets some of the inherent limitations (e.g., bandwidth, memory, processing capability, display real estate . . . ) of portable devices as compared to desktop computers. It is to be appreciated that content deemed of low value based on device capabilities and user-related metrics can be selectively aged out of storage to make room for new content.

The disclosed methods are not only for "wireless" devices, but also find application for devices that may be tethered at times—tethering is a great opportunity for doing intensive log downloads, analysis, and upload of large amounts of cached information. Moreover, predictions can be made about the amount of time between tetherings, time until next tether (or wireless connection), etc., to guide decisions about whether to use an expensive or bandwidth-limited wireless signal or wait for a cheaper, or higher-rate channel, or until a wired tether becomes available.

Figure 2:
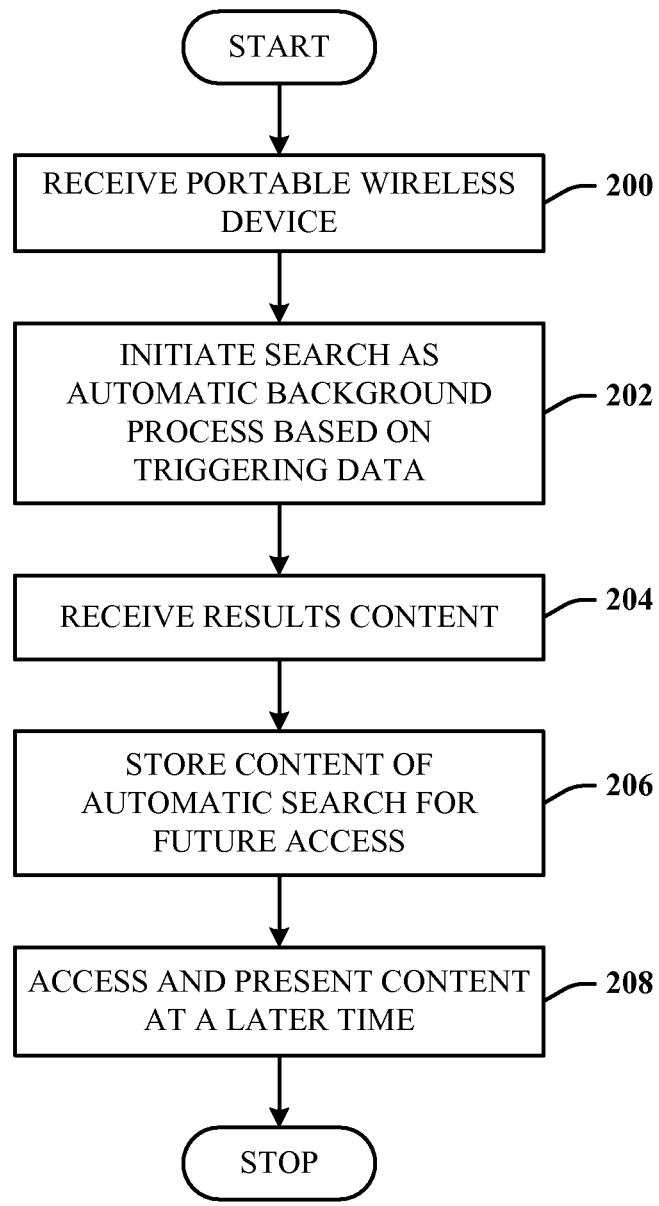
FIG. 2 illustrates a methodology of managing content in a portable wireless device.

FIG. 2 illustrates a methodology of managing content in a portable wireless device. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a portable wireless device (e.g., a cell phone) is received that includes the innovative content management architecture. At 202, based on triggering data, a background search process is initiated. At 204, search results content (e.g., audio file, video file, image, graphics, text . . . ) is received. At 206, the content is stored in the device. Storage can be in cache (or high speed) memory for quick access. Alternatively, or in combination therewith, storage can be in mass (or slower speed) storage such as associated hard drives and ROM (read-only memory), for example. At 208, the content is accessed and presented at some time after the initial storage. For example, if the portable device is a cell phone and includes a global positioning system (GPS) location of a user is known as well as businesses near to the user, a search can be performed that pre-fetches and caches information relating to such businesses (e.g. restaurant menus, sales, type of business, . . . ) and based upon the user's preference, state and/or content a subset of the pre-fetched or pre-stored information can be selectively presented to the user. As will be discussed in greater detail infra, the architecture can be implicitly or explicitly trained so as to be tuned to present relevant information at an appropriate frequency as well as time. Moreover, a utility-based analysis can be performed that factors the inferred cost of interrupting the user with content when not desired versus the inferred benefit to the user of presenting the content.

Figure 3:
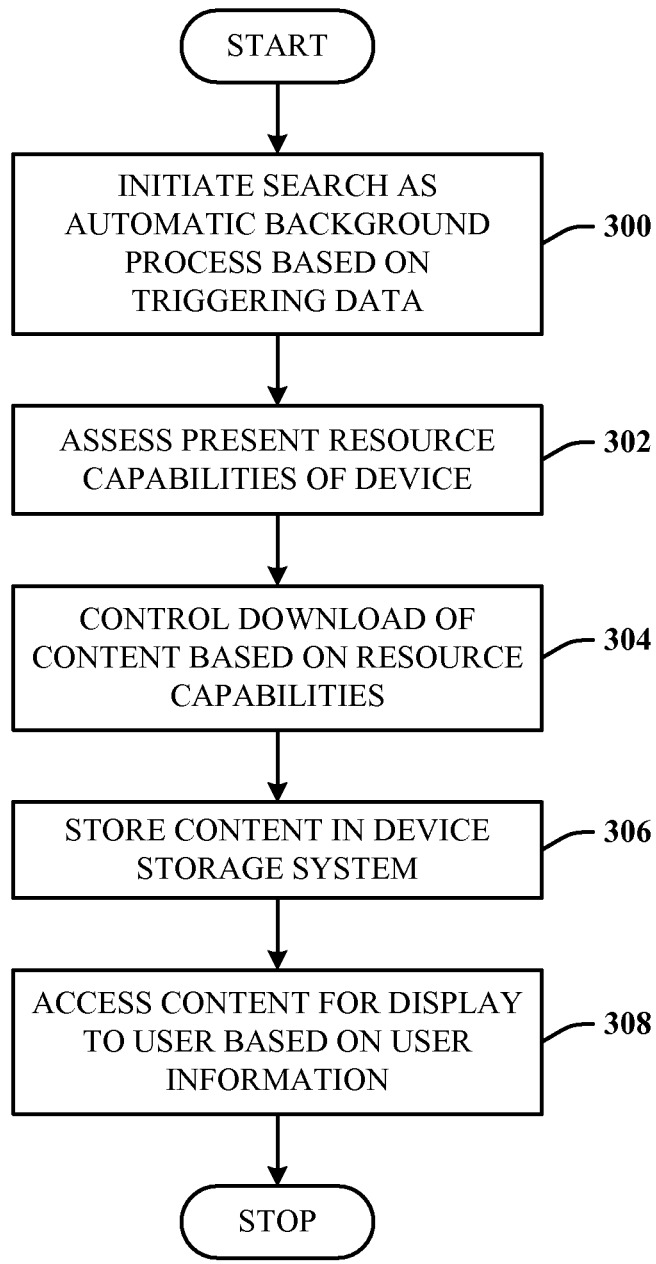
FIG. 3 illustrates a methodology of managing content based on device resources in accordance with another aspect.

Referring now to FIG. 3, there is illustrated a methodology of managing content based on device resources in accordance with another aspect. At 300, a search is initiated as a background process based on triggering data. At 302, present capabilities of the device are assessed. This includes determining one or more of the running processes of the device, and available memory or storage, should the content download begin immediately or in the very near future. For example, if it is determined that search results content includes an audio file, which file normally is much larger than a text file, for example, download of such a larger file can require device resources that could impact currently-running device processes. Thus, it could be more beneficial to download the content during an off-peak time, or control the download to reduce (or trickle) the amount of content being downloaded such that the currently-running processes are not impacted, or at least minimally burdened. Accordingly, at 304, download of the content is based on device resource capabilities.

Device resource capabilities can also include assessing the bandwidth of network connection between the device the wireless access point at any point in time, alone or in combination with the state of the device processes. At 306, the content is downloaded and stored in the device (e.g., cached). At 308, the content is accessed and displayed at some time after the initial storage.

Figure 4:
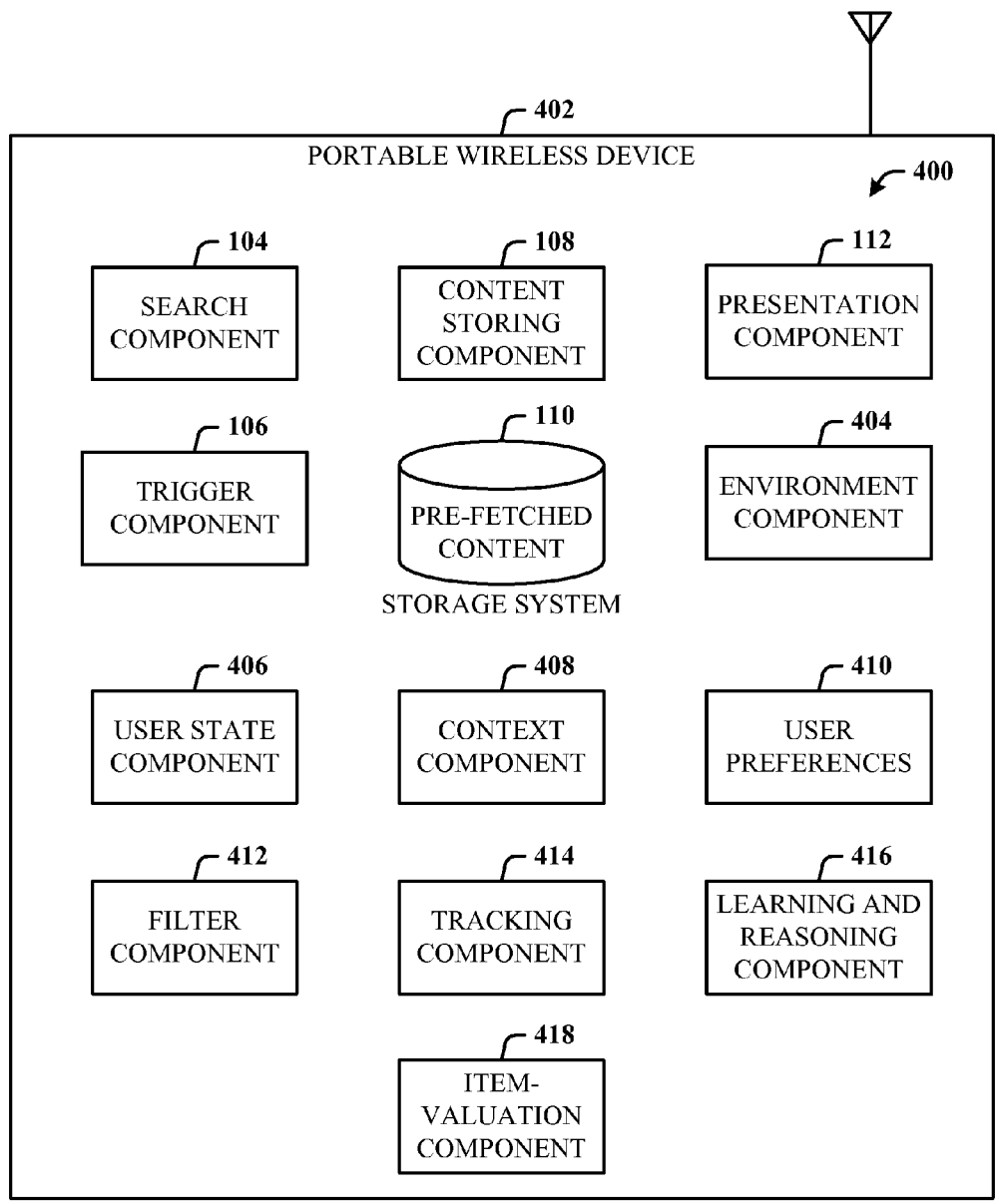
FIG. 4 illustrates an alternative system that facilitates content management in a portable wireless device in accordance with a novel aspect.

FIG. 4 illustrates an alternative system 400 that facilitates content management in a portable wireless device 402 in accordance with a novel aspect. The system 400 includes the search component 104, trigger component 106, content storing component 108 that facilitates storage and access of the content corresponding to the automated search via the storage system 110, and presentation component 112 of FIG. 1. Additionally, the system 400 includes an environment component 404 that monitors (or senses) environmental conditions such as temperature, humidity, altitude, pressure, and velocity, for example. The system 400 further includes a user state component 406 that monitors user state such as associated with user interaction with the device, for example.

With a user's permission, logs of a users' interactions with cached information and other interactions or activities on the device can be relayed in real-time or in summary packets of information to servers for guiding decisions about the best information to send in the future. This can be done on a single-user basis or based on the analysis of populations of user behaviors accessed via such logs.

A context component 408 monitors device (and hence, user) context. Context can be physical geolocation context such as to whether the user is located in or near a city or in the mountains, for example. Context can be determined according to a more granular level such as whether the device is near a street intersection or near a retail store, for example. Context can also be in relation to what software applications the user may currently be interacting with (e.g., an e-mail program, a word processing program, . . . ).

A user preferences component 410 stores and provides access to user preferences information. User preferences can be utilized to filter the content to be downloaded, or even to filter the context after being downloaded and to be presented. User preferences information can be fixed according by the user, or allowed to be modified based on user interaction, for example.

A filter component 412 can also be employed as a means to filter content returned from a search. In one example, this is used to prevent children from downloading unacceptable content. In another application, the filter component 412 can be used by a merchant to limit the type of content returned by a search to only its approved content. The filter component 412 can also filter content based on the user preferences as created in the preferences component 410.

The system 400 can also include a tracking component 414 that tracks and logs system parameters, user interaction and, other data and events. The tracking component 414 facilitates maintaining a history of use of the device 402. This can include updates applied, user changes, device settings, software accessed, and so on. Some or all of this information can be analyzed and processed to determine how and when search results content will be managed and presented.

The system 400 of the device 402 can also employ a machine learning and reasoning (MLR) component 416 which facilitates automating one or more features in accordance with the subject innovation. The invention (e.g. in connection with selection) can employ various MLR-based schemes for carrying out various aspects thereof. For example, a process for determining when to download content of a search can be facilitated via an automatic classifier system and process.

A classifier is a function that maps an input attribute vector, $x=(x1, x2, x3, x4, xn)$, to a class label class(x). The classifier can also output a confidence that the input belongs to a class, that is, $f(x)=confidence(class(x))$. Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank or priority.

As will be readily appreciated from the subject specification, the subject invention can employ classifiers that are explicitly trained (e.g. via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

In one example, the MLR component 416 is used to modify user preferences of the preferences component 410 based on how the user interacts with the device hardware, alone or in combination with user interaction with the device software.

According to another alternative example, the MLR component 416 can learn and reason about data from and events occurring with any other system component (104, 106, 108, 110, 112, 404, 406, 408 and 410). In a more specific example, the MLR component 416 can change trigger parameters of the trigger component 106 based on these data and events.

In yet another example, the MLR component 416 can learn and reason about when to age out or archive cached content. This can be based simply on time, or on the type of content. For example, if there are several items of content currently being cached or considered for being cached, the MLR component 416 can decide which items to discard and which to retain based on user context, user state, priority, and/or other factors, just to names a few factors for consideration.

The caching and discarding of information may be guided by logical or statistical predictions about the future intentions, state, or other aspect of a user's context, based on models built from observations about a user's locations and activities made locally or over longer periods of time.

Additionally, given available memory for caching, a cost-benefit analysis (exact or approximate) can be employed that maximizes the overall expected value or expected utility of the cached information at any moment, based on current state and/or predicted future state of the user. In such a decision-theoretic approach, an item-valuation component 418 can be provided that assigns measures of value to each candidate item, and the memory cost of each item is considered in conjunction with the value of the items to make caching decisions. For example, the expected utility of the overall cache can be maximized through an exact or approximate knapsack analysis. The item-valuation component 418 can be based in association with multiple mechanisms, including the machine learning and reasoning component 416 and other mechanisms that provide a direct assignment of value. For example, an advertiser could directly assign a value to one or more items, for example, via bidding on the value of providing impressions based on the item for users of particular demographics, current or future contexts, or interaction scenarios—and then paying a price that drives the value assigned to an item.

Figure 5:
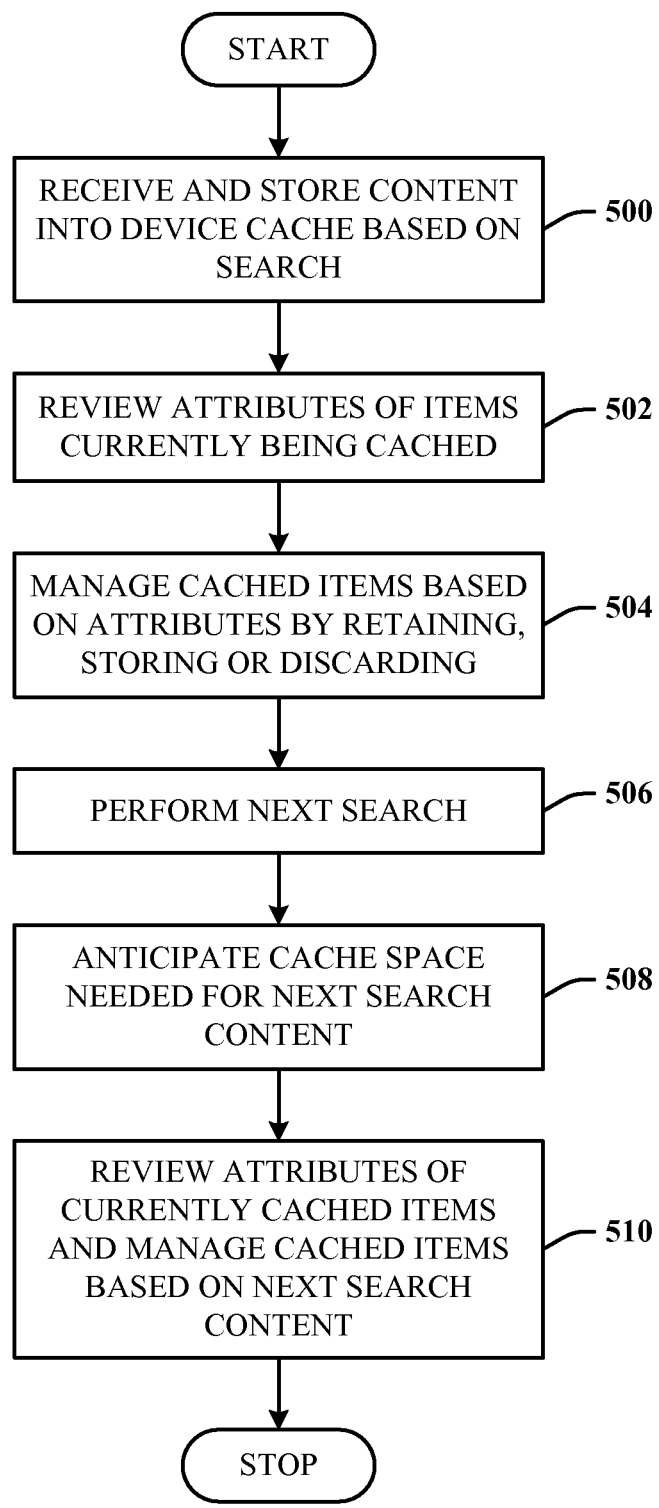
FIG. 5 illustrates a methodology of cache management based on content.

FIG. 5 illustrates a methodology of cache management based on content. At 500, content is received and stored in the device cache. At 502, attributes of cached items are reviewed. At 504, based on the attributes, one or more cache items are retained in cache, stored, or discarded. At 506, a next background search is initiated automatically. At 508, cache space needed for next search content is anticipated. At 510, attributes of currently cached items are reviewed and cached items based on next search content are managed. Thus, the system continually monitors and manages its caching capability with respect to existing cached items and properties of incoming content.

Figure 6:
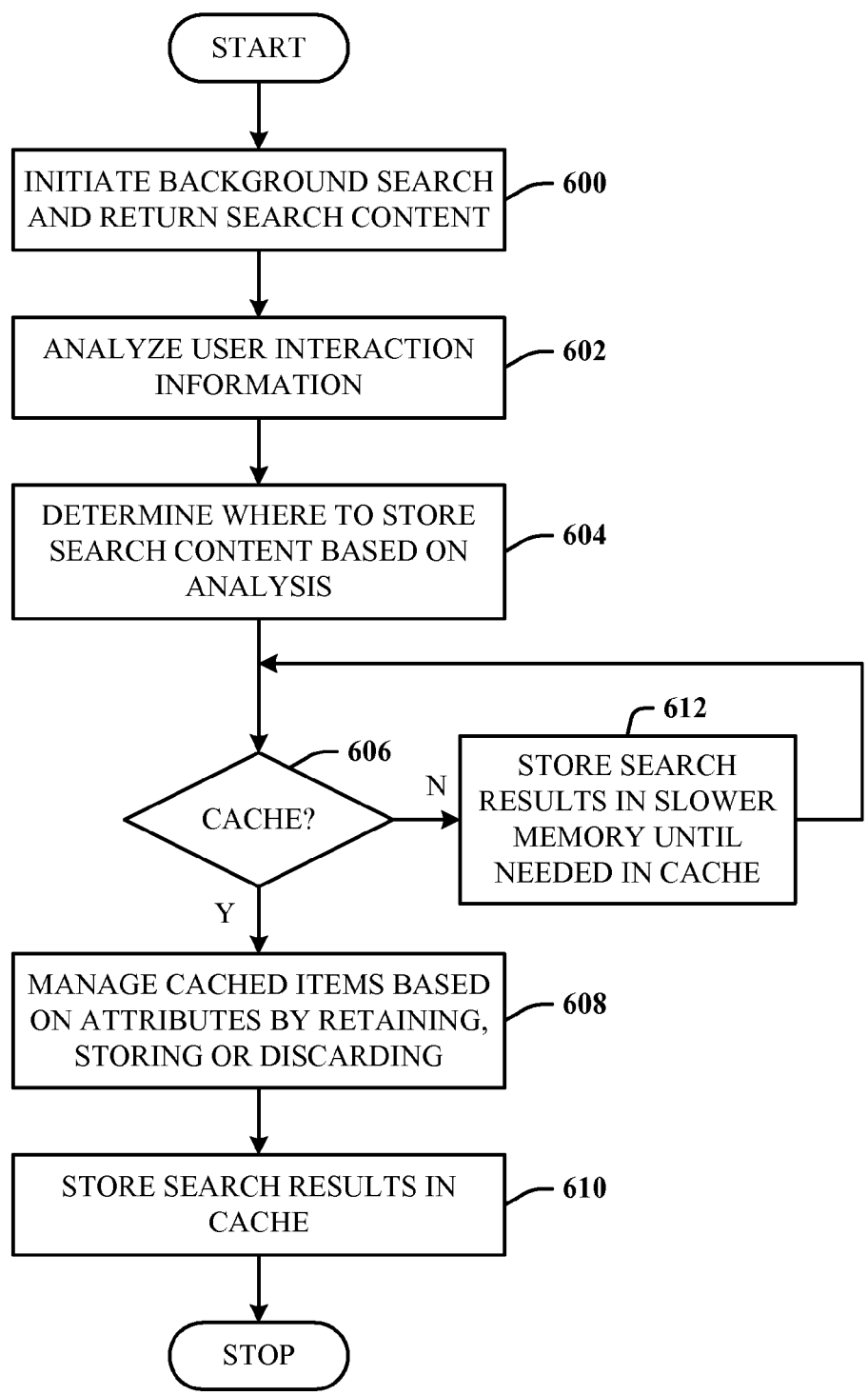
FIG. 6 illustrates an alternative methodology of managing device memory in accordance with the disclosed innovation.

Referring now to FIG. 6, there is illustrated an alternative methodology of managing device memory in accordance with the disclosed innovation. At 600, a search is initiated as a background process. At 602, user interaction data is analyzed in preparation for determining where to store the search results. At 604, the system determines where to store the search content based on the analysis. At 606, if the content is to be stored in cache, the process continues to 608 to manage the currently cached items based on content attributes by retaining content in cache, offloading content from cache into slower memory (e.g., mass storage type storage) or discarding content. Content discard can include discarding content from the slower memory thereby making room for cached content to be moved to the slower memory, or simply discarding content directly form the cache, for example.

At 610, the search results are then stored in the cache memory. Alternatively, if the search content is not to be stored directly into cache, the process proceeds from 606 to 612, to store the content in slower memory until needed in cache memory. The system will then continue to monitor user interaction as a determining factor for moving the content into cache memory for presentation to the user.

Figure 7:
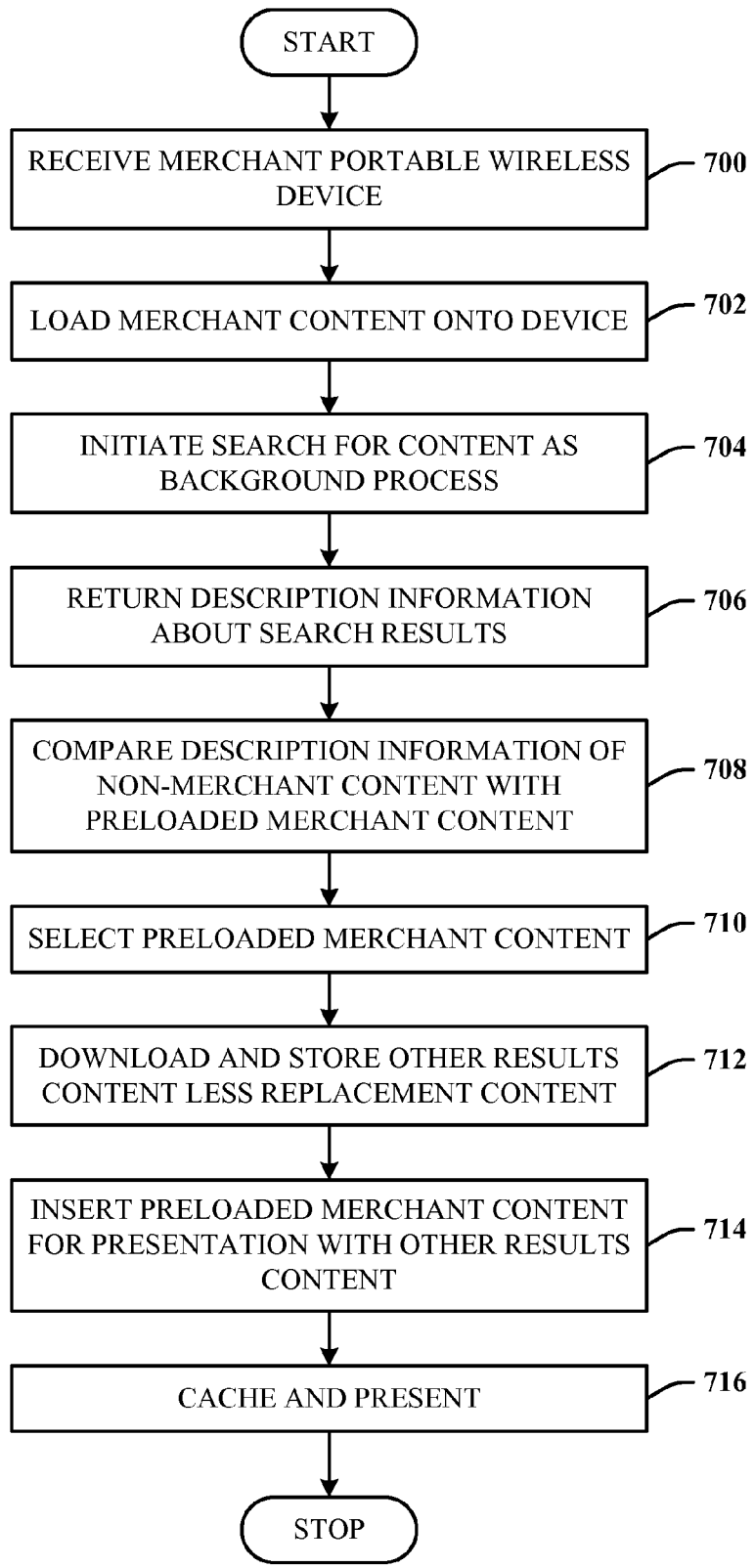
FIG. 7 illustrates a flow diagram of a methodology of managing merchant-based content in accordance with an aspect.

FIG. 7 illustrates a flow diagram of a methodology of managing merchant-based content in accordance with an aspect. At 700, a portable wireless device for sale by a merchant is received. At 702, merchant content is loaded on the device. This merchant content is to be presented to the device user in place of comparable content returned by a background search. At 704, a search for content (e.g. merchant as well as non-merchant) is initiated as a background process. At 706, merchant and/or non-merchant search results can be obtained and description information about the search results returned. In one implementation, brief description information is returned for all search results. In another implementation, only brief description information about non-merchant results is returned for analysis. In other words, rather than download the results, which can contain large files such as audio files, video files, and images, for example, by downloading only description information sufficient to identify the file types and content description, connection bandwidth and device resources can be conserved or at least minimally impacted.

More specifically, if one search result is an audio file, a brief description can include the file type (e.g., wav file), and some information about the content (e.g., country western music and artist name). This description information may only comprise several kilobytes of data, whereas the complete audio file may comprise several megabytes of data.

Accordingly, if the merchant has preloaded country music more closely affiliated with its products and/or services, the system can replace the search results associated with the description information with its preloaded country music audio file, and cache it for presentation to the device user at the desired time.

At 708, the system compares the description information with the preloaded merchant information. At 710, the preloaded merchant content is selected. At 712, the other search results are downloaded and stored, less the search result content that will be replaced. At 714, the selected preloaded content is inserted for presentation with the other search results content. At 716, the content is cached and presented to the user at the desired time.

When used in combination with one advertising model, for example, a merchant can offer a free cell phone provided that the user allows a pre-installed filter to receive content and advertisements (e.g., via streaming technology) approved by the merchant. Alternately or in combination therewith, the cell phone can come loaded with pre-cached advertisements that are dynamically displayed as a function of various triggers (e.g., current device location, user state/context, user receptiveness to particular advertisements, and so on).

Figure 8:
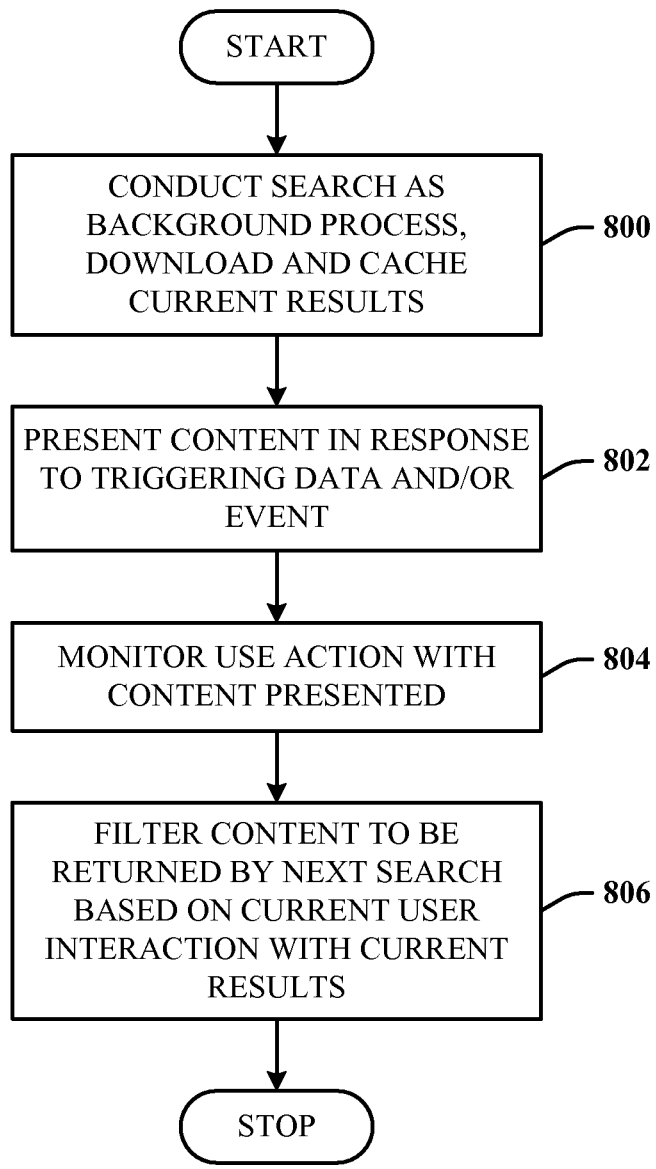
FIG. 8 illustrates a methodology of employing machine learning and reasoning for adapting content based on user information in accordance with one aspect.

FIG. 8 illustrates a methodology of employing machine learning and reasoning for adapting content based on user information in accordance with one aspect. At 800, a search is conducted as a background process, and the results content downloaded and cached for presentation to user. At 802, the content is presented to the user in response to triggering data and/or event. At 804, the MLR component monitors user interaction with the content presented. At 806, content to be returned is filtered during next search based on user interaction with previous search results.

For example, if it is determined that the user is spending less time listening to content, the MLR component can learn and reason about this to cause a similar type of content to be pre-fetched for presentation, but of a different format, such as viewable content. Rather than adapting to a different format, the MLR component can adjust the content by size and/or resolution. Again, if it is learned that the user is cutting short content being presented, the MLR component can cause to be pre-fetched content that plays its entirety in less time.

In another example, if it is determined that the user is moving quickly, as associated with acceleration and velocity information associated with a quick walk, the time for content presentation may be limited. Accordingly, the content searched and cached can be made shorter in duration to accommodate the user.

It is to be appreciated that the background process described heretofore can be that process which is executing while the user is interacting with the device, such as making a phone call when the device is a cell phone, or checking e-mail when the device is a portable computer. However, in another implementation, the background searching process can be performed while the user is not interacting with the device at all. For example, when no user interaction is being processed, or programs being executed, the device can have as its disposal more system resources. Thus, without the user being aware of the device activity, selected or minimal device systems can be activated to perform the search and return the search content to the device. Under these conditions, the returned content can be stored directly onto the device storage subsystem rather than needing to be cached for quick access during times of concurrent user interaction. Thereafter, if the user begins to interact with the device, selected portions of the content can then be moved into the device cache for anticipated presentation to the user.

The amount of memory available for caching and the utility of the content cached, from the perspective of a user or other decision maker (e.g. the advertiser), can be used in making decisions about the best content to store. For example, use can be made of a method that attempts to maximize the overall expected utility of cached information by employing an exact or approximate knapsack analysis, such as a value-density approximation. The value of the items can be made a function of context or age in the cache, and an ongoing re-optimization can be performed, driving a process for refreshing of the cached information via discarding of old cached information and downloading of new information.

Figure 9:
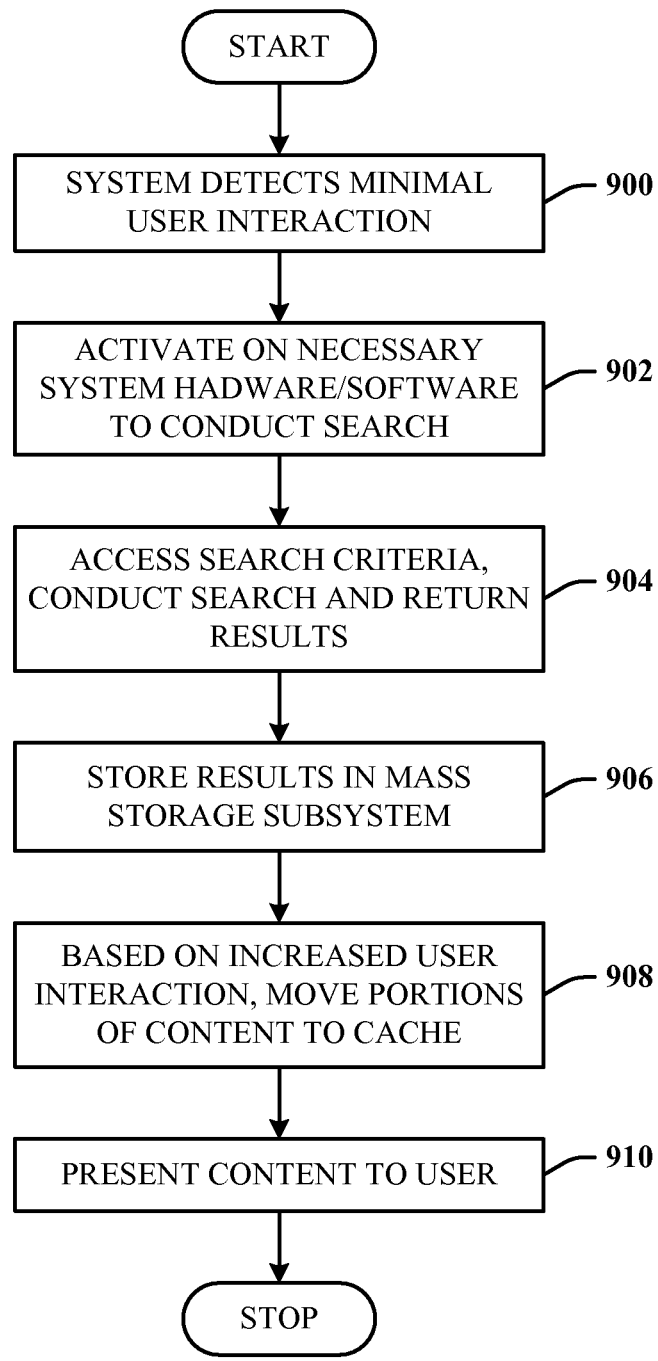
FIG. 9 illustrates a flow diagram of a methodology of managing content based on an offline mode.

FIG. 9 illustrates a flow diagram of a methodology of managing content based on an offline mode. At 900, the system detects that the user is not interacting with device (e.g., by allowing the device to enter a standby mode, or by the user selecting the power-down button). At 902, minimal system hardware and/or software are activated for search process execution. At 904, search criteria are accessed, and the search performed to return results. At 906, the results are stored to a mass storage subsystem of the device. At 908, portions of content are moved to the device cache based on user interaction with device (e.g., exiting a standby mode). At 910, the content is presented to user based on user interaction.

It is to be understood that is may be desired that certain data or content be locked into a device. Additionally, this data can be configured for residing in cache memory at all times for presentation along with other content. For example, a basic template can be locked into the device such that all other content is presented within this template. The template itself can include information such as advertisements or vendor information that will be presented each time other content is presented to the device user. The template can be configured for only vendor access, thereby prohibiting the user from changing or preventing the template from being presented. The template can be configure for not only visual presentation but also for audio content such that each time it is presented, a brief audio clip is executed as a precursor to perceiving the searched content.

Figure 10:
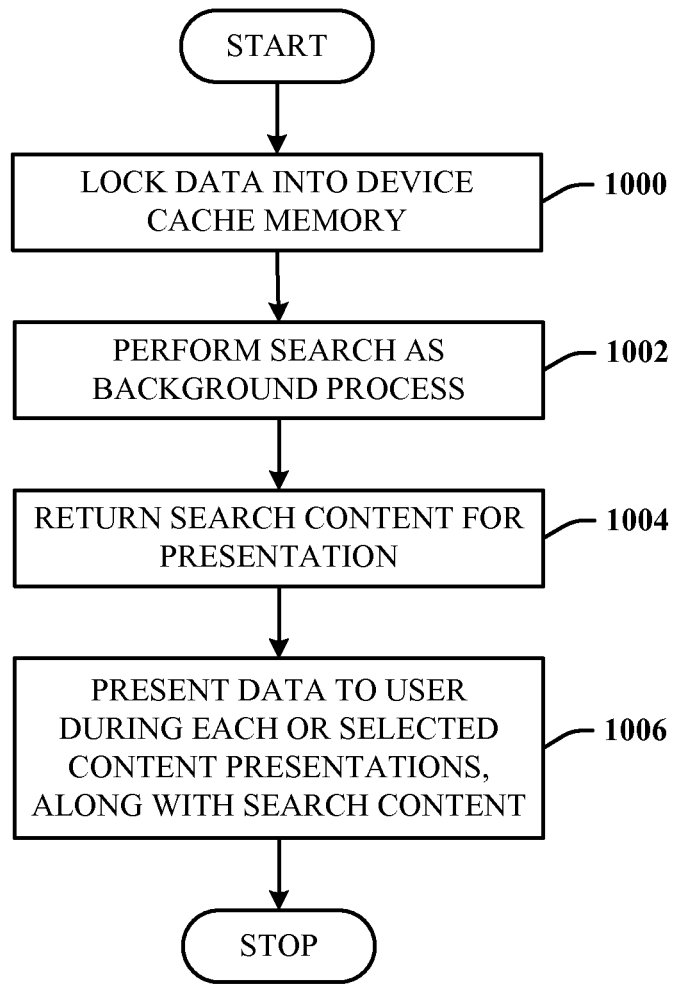
FIG. 10 illustrates a methodology of content management utilizing locked-in data.

Accordingly, FIG. 10 illustrates a methodology of content management utilizing locked-in data. At 1000, data is preloaded and locked into the device cache memory. Locked-in in this context can mean that the data is hard-coded into the cache memory at predetermine memory locations or will always be uploaded from the mass storage or a slower memory subsystem as a system startup function or early in device operation or use. At 1002, the search is conducted as a background process. At 1004, search results are returned for presentation. At 1006, the data is presented each time content is presented to the user, and along with the content or along with selected content. Content can be obtained by way of searches, that is, prefetching or pulling the content to the device. In another implementation, the content can be pushed to the device based on information transmitted to the pushing system. For example, if the device is not sufficiently robust in hardware and/or software capabilities, streaming content can be pushed to the device and cached briefly in response to user interaction or other triggering data and/or events.

In yet another implementation, remote systems can push content to the device based on search results to be returned, which content is not similar to the search results. For example, if a website detects a search by the device, and returns content, it can automatically push one piece of other content along with the results that may indicate that a special is being offered at this very moment, for example.

A more recent web development technique employs AJAX (asynchronous javascript and XML) for creating interactive web applications. AJAX utilizes a collection of technologies together, such as XML (extensible markup language), XHTML (or HTML) for markup and styling, and an XMLHttpRequest object for asynchronous data exchange, a DOM for displaying and interacting with presented information. Under such similar implementations, content can be trickled to the device for viewing or presentation. Rather than present separate windows for the content, a single scrolling window can be presented having a continually expanding scroll bar, for example, as the content continues to arrive.

It is to be appreciated that searching need not be to a remote network location (e.g., on the Internet), but can be facilitated against a desktop computing system and its information. For example, when the user brings the portable device (e.g., a cell phone) within a suitable range of a desktop computer, the device can synch up and be utilized to search the desktop computing system for information as well.

Given that the hardware and/or software capabilities of the portable wireless device can be limited, another alternative implementation allows the user to subscribe only to the changes in the content. Rather than searching for new content, the search returns only the changes to the existing content, returns the changes, merges the changes into the compatible local content, caches it, and presents it when desired.

Figure 11:
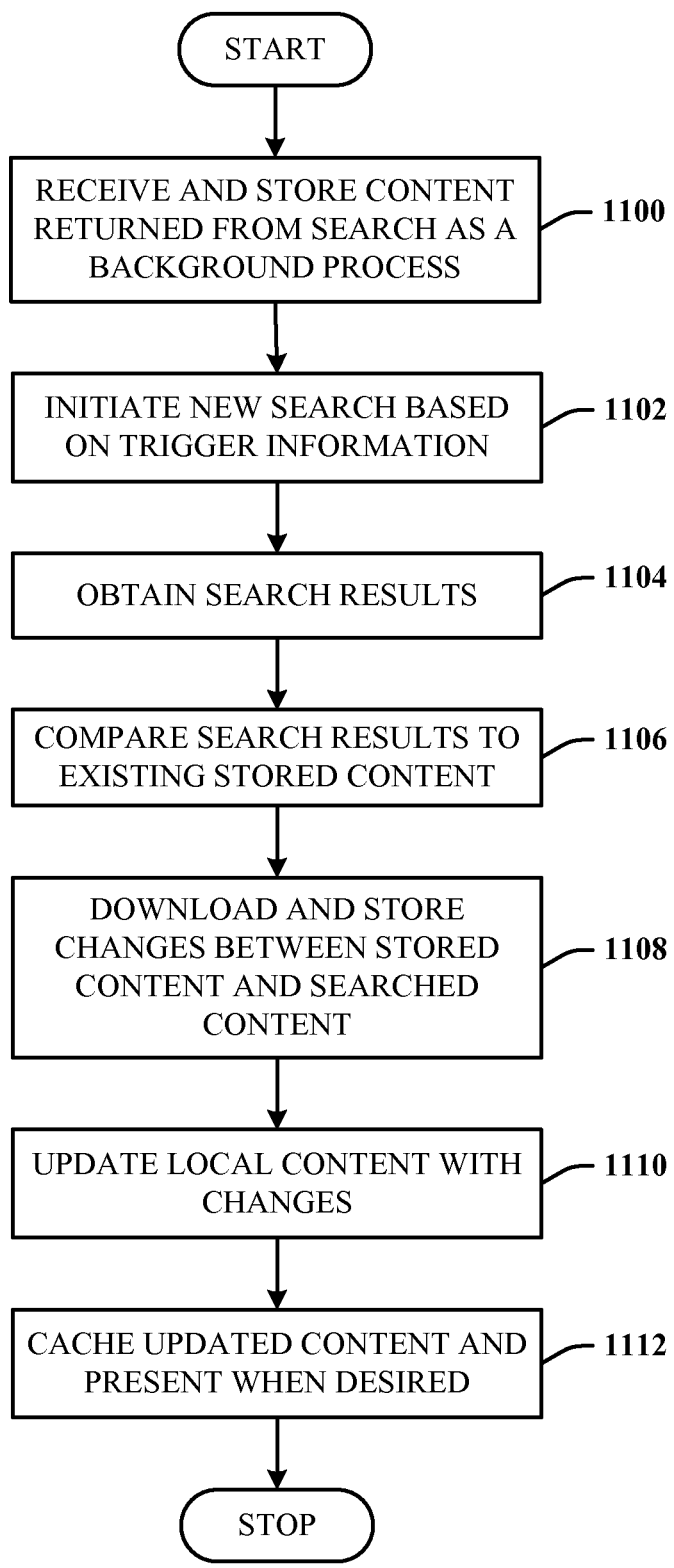
FIG. 11 illustrates a methodology of managing content by processing content changes in accordance with another aspect.

FIG. 11 illustrates a methodology of managing content by processing content changes in accordance with another aspect. At 1100, a background search is conducted, and results returned and stored on the device. At 1102, a new search is initiated based on search trigger information. At 1104, the search results are obtained. This can mean that the results are stored temporarily at a remote location or downloaded to the device. At 1106, the new search results are compared to the local content. At 1108, the changes between the local content and the new search results are downloaded and stored on the device. At 1110, the local content to which the changes apply is updated with the changes. At 1112, the updated content is cached in preparation for presentation to the device user when desired. In another version of the above, just the changes will be displayed, and no other content. In yet another version thereof, the user is given a choice of subscribing to the changed information.

In yet another implementation of the subject invention, caching can be provided on the network in support of downloading and presenting content to a wireless device. In other words, content shuffling, aging, etc., can be performed on the network, and only the most relevant or inferred to be relevant content is then downloaded and presented just-in-time to the user.

Figure 12:
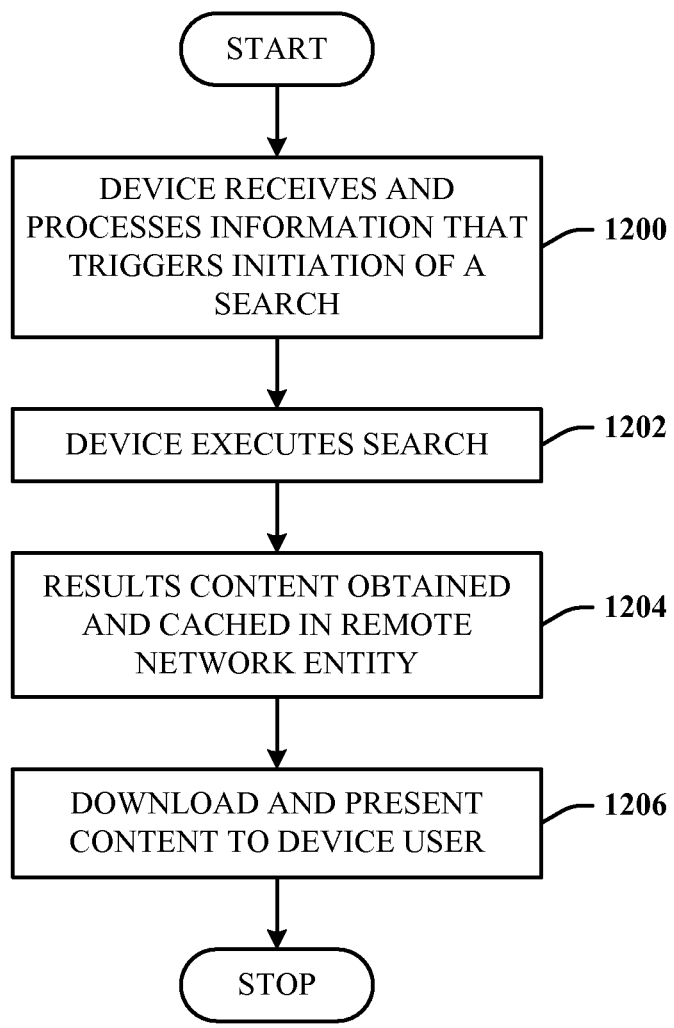
FIG. 12 illustrates a methodology of just-in-time content presentation for a portable wireless device from a remote entity.

FIG. 12 illustrates a methodology of just-in-time content presentation for a portable wireless device. At 1200, the device receives and processes information that triggers initiation of a background search. At 1202, the search is executed by the device. At 1204, the search results content is obtained and cached remotely on a network entity. At 1206, based on further information received from the device at the network entity, the content is downloaded to the device, cached, and presented to the device user. In order to better define the automated search criteria or terms, the device system can monitor other device aspects. For example, as part of the search background process, the device system looks at desktop data such as links, icons, etc., or data associated with e-mail, or data associated with recently accessed websites (e.g., in a Favorites folder)

Figure 13:
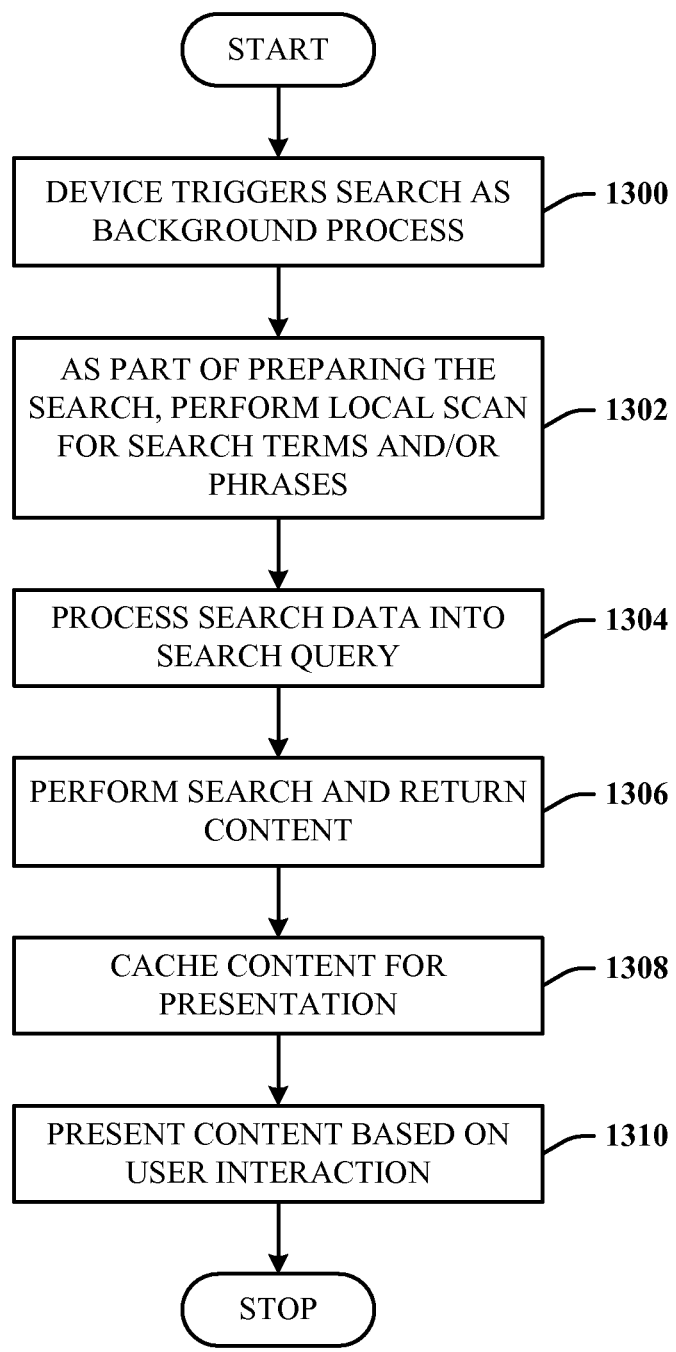
FIG. 13 illustrates a flow diagram of a methodology of developing a search query for the search background process.

FIG. 13 illustrates a flow diagram of a methodology of developing a search query for the search background process. At 1300, the device triggers initiation of the search. At 1302, a local scan is initiated for terms and/or phrases or other information to employ in the search query. At 1304, the information is inserted into the search query. At 1306, the search is performed and content returned. At 1308, the content is cached in preparation for presentation. At 1310, the content is presented based on user interaction with the device. Note that where the portable device can link up via a peer-to-peer connection, desktop information of the other peer device (e.g., a desktop computer of the same or different user) can also be employed.

In another alternative implementation, content for prefetch and caching can be based on what other device users have been searched. For example, based on the particular type of device, or the current location of the device and what other users searched when they were at the same location, this can be the basis for deriving the search terms.

In one specific example, the device can compute the location of a user, and process user preferences when at this location, and based on this, perform an automatic search for content related to how the user interacts when at this location. Consider that the location of the user device is determined by a geolocation technology to be at the airport, for example. Machine learning and reasoning can infer that the user may eventually be boarding an airplane or exiting an airplane based also on intrinsic information retrieved from an e-mail program or calendar that the user is traveling. Content searched, downloaded, and presented can be related to information the person likes to read when in these airport situations.

In a shopping and consumer activities environment, shopping lists and interest lists can be auto-generated and, automatically enabled and presented in response to the user walking into a mall or the user driving past the mall, for example. Given the velocity of the user device and direction of movement, content can be search and the results streamed into the device cache in preparation for expected presentation as the user moves past an anticipated point of interest. Multimedia information can be cached and discarded automatically based on user location relative to malls and businesses, without the user noticing any burden to device systems. Additionally cached content can be rendered at appropriate times such as during commercial breaks while listening to other media.

Figure 14:
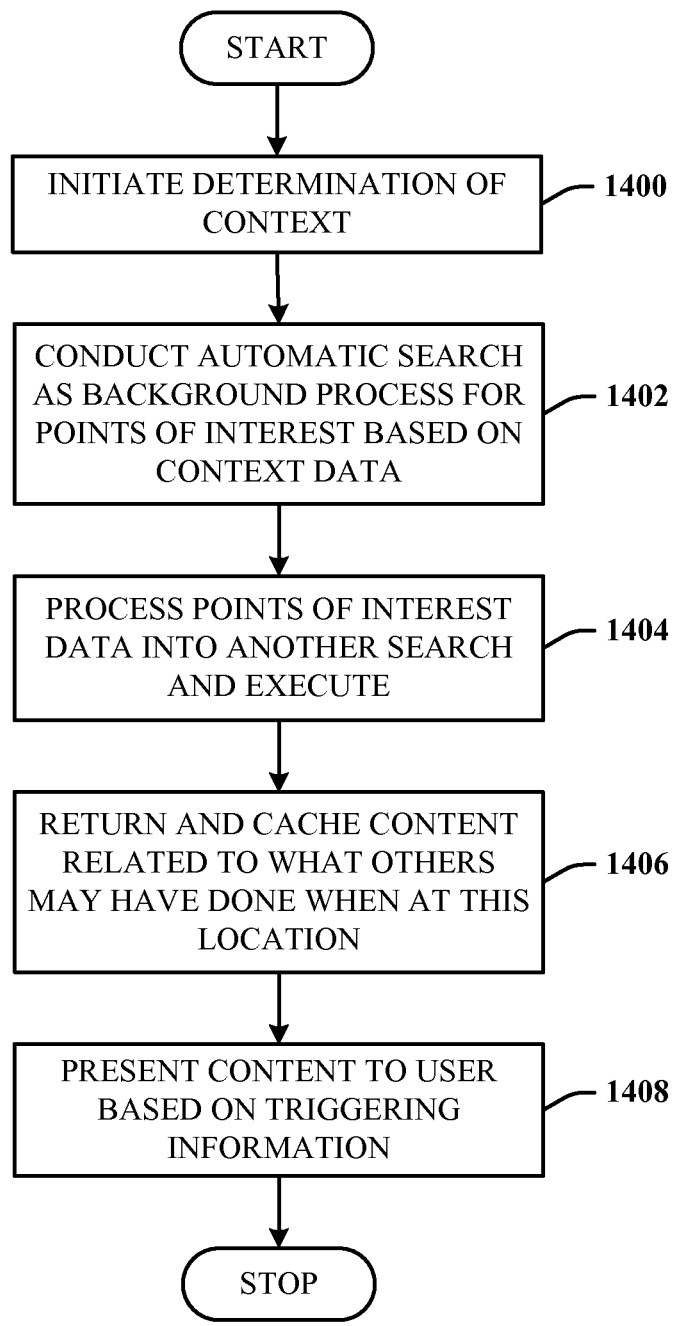
FIG. 14 illustrates a flow diagram of a methodology of managing content based on other user information.

Accordingly, FIG. 14 illustrates a flow diagram of a methodology of managing content based on other user information. At 1400, the system initiates determination of the device and/or user geolocation context. At 1402, the system automatically searches based on the geolocation information for relevant points of interest. At 1404, the point of interest data is received and processed into another search query and executed. At 1406, content about what others may have done when at this geolocation is received and cached. At 1408, this information is presented to the user based on trigger information.

In yet another exemplary implementation, mobile query logs, logs tagged by location, geolocation technologies (e.g., GPS), resources provided and/or made available in the area of the device, velocity of device as carried by a vehicle driver, and predicted destination are just examples of information that can be obtained and utilized for searching as a background process for the portable wireless device. Moreover, as indicated supra, intentions can be inferred by finding and analyzing information found local to the device as well as web-based information of the device user and other similarly situated users.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 15:
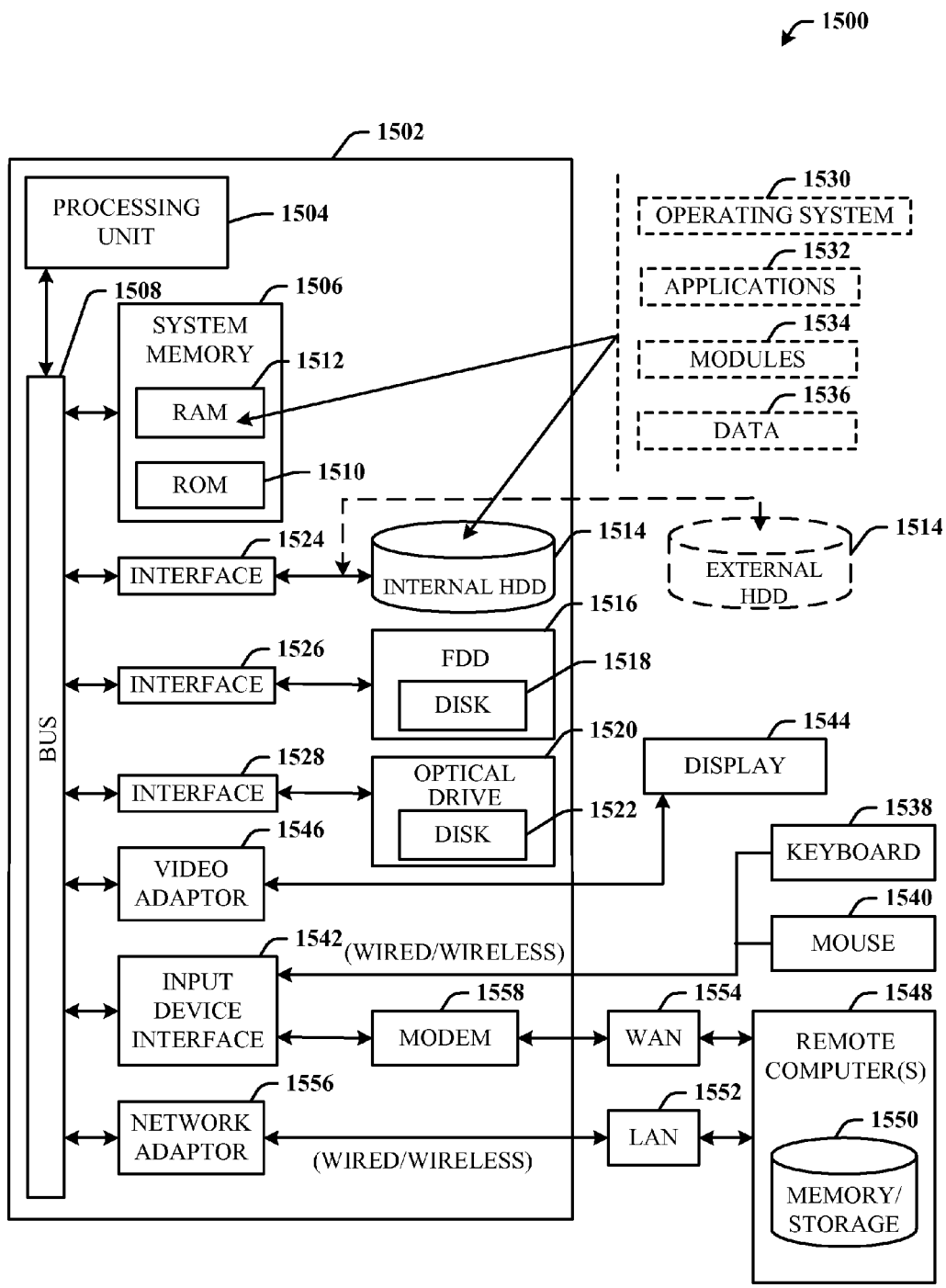
FIG. 15 illustrates a block diagram of a computer operable to execute the disclosed background searching and caching architecture.

Referring now to FIG. 15, there is illustrated a block diagram of a portable computer operable to execute the disclosed background searching and caching architecture. In order to provide additional context for various aspects thereof, FIG. 15 and the following discussion are intended to provide a brief, general description of a suitable computing environment 1500 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary environment 1500 for implementing various aspects includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1502 through one or more wired/wireless input devices, for example, a keyboard 1538 and a pointing device, such as a mouse 1540. Other input devices (not shown) may include a microphone, a touch pad, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc. A display 1544 (e.g., an LCD) is also connected to the system bus 1508 via an interface, such as a video adapter 1546, for the presentation of information and to facilitate user interaction.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11 g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 16:
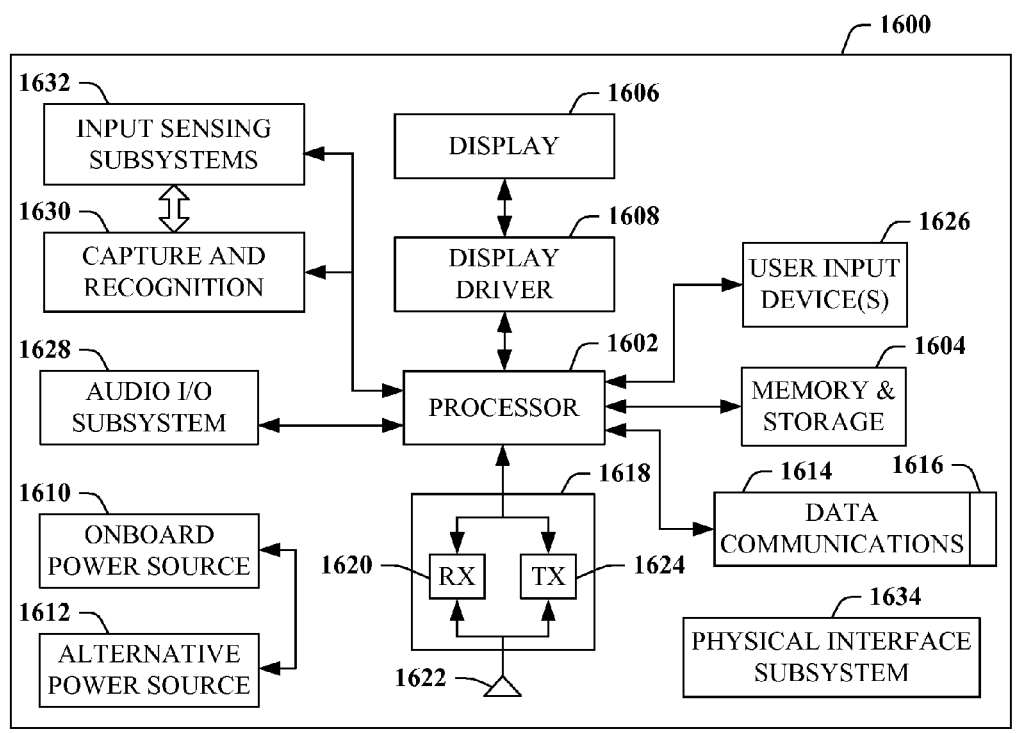
FIG. 16 illustrates a schematic block diagram of a portable wireless device for user- and context-specific prefetching and caching in accordance with the disclosed architecture.

FIG. 16 illustrates a schematic block diagram of a portable wireless device 1600 for user- and context-specific prefetching and caching in accordance with the disclosed architecture. The device 1600 includes a processor 1602 that interfaces to one or more internal components for control and processing of data and instructions. The processor 1602 can be programmed to control and operate the various components within the device 1600 in order to carry out the various functions described herein. The processor 1602 can be any of a plurality of suitable processors (e.g., a DSP-digital signal processor), and can be a multiprocessor subsystem.

A memory and storage component 1604 interfaces to the processor 1602 and serves to store program code, and also serves as a storage means for information such as data, applications, services, metadata, device states, and the like. For example, language modules and context data, user profile information, and associations between user context, images, text, speech, video files and other information can be stored here. Additionally, or alternatively, the device 1600 can operate to communicate with a remote system that can be accessed to download the language modules and other related context determination information that might be needed based on a user providing some information as to where the user may be traveling or into which contexts the user will be or typically travels. Thus, the device 1600 need only store a subset of the information that might be needed for any given context processing.

The memory and storage component 1604 can include non-volatile memory suitably adapted to store at least a complete set of the sensed data that is acquired from the sensing subsystem and/or sensors. Thus, the memory 1604 can include RAM or flash memory for high-speed access by the processor 1602 and/or a mass storage memory, e.g. a micro drive capable of storing gigabytes of data that comprises text, images, audio, and/or video content. According to one aspect, the memory 1604 has sufficient storage capacity to store multiple sets of information relating to disparate services, and the processor 1602 can include a program that facilitates alternating or cycling between various sets of information corresponding to the disparate services.

A display 1606 can be coupled to the processor 1602 via a display driver subsystem 1608. The display 1606 can be a color liquid crystal display (LCD), plasma display, touch screen display, or the like. The display 1606 functions to present data, graphics, or other information content. Additionally, the display 1606 can present a variety of functions that are user selectable and that provide control and configuration of the device 1600. In a touch screen example, the display 1606 can display touch selectable icons that facilitate user interaction for control and/or configuration.

Power can be provided to the processor 1602 and other onboard components forming the device 1600 by an onboard power system 1610 (e.g., a battery pack or fuel cell). In the event that the power system 1610 fails or becomes disconnected from the device 1600, an alternative power source 1612 can be employed to provide power to the processor 1602 and other components (e.g., sensors, image capture device, . . . ) and to charge the onboard power system 1610, if a chargeable technology. For example, the alternative power source 1612 can facilitate interface to an external a grid connection via a power converter. The processor 1602 can be configured to provide power management services to, for example, induce a sleep mode that reduces the current draw, or to initiate an orderly shutdown of the device 1600 upon detection of an anticipated power failure.

The device 1600 includes a data communication subsystem 1614 having a data communication port 1616, which port 1616 is employed to interface the device 1600 to a remote computing system, server, service, or the like. The port 1616 can include one or more serial interfaces such as a Universal Serial Bus (USB) and/or IEEE 1394 that provide serial communications capabilities. Other technologies can also be included, but are not limited to, for example, infrared communications utilizing an infrared communications port, and wireless packet communications (e.g. Bluetooth™, Wi-Fi, and Wi-Max). If a smartphone, the data communications subsystem 1614 can include SIM (subscriber identity module) data and the information necessary for cellular registration and network communications.

The device 1600 can also include a radio frequency (RF) transceiver section 1618 in operative communication with the processor 1602. The RF section 1618 includes an RF receiver 1620, which receives RF signals from a remote device or system via an antenna 1622 and can demodulate the signal to obtain digital information modulated therein. The RF section 1618 also includes an RF transmitter 1624 for transmitting information (e.g., data, service(s)) to a remote device or system, for example, in response to manual user input via a user input device 1626 (e.g., a keypad), or automatically in response to detection of entering and/or anticipation of leaving a communication range or other predetermined and programmed criteria.

The device 1600 can also include an audio I/O subsystem 1628 that is controlled by the processor 1602 and processes voice input from a microphone or similar audio input device (not shown). The audio subsystem 1628 also facilitates the presentation of audio output signals via a speaker or similar audio output device (not shown).

The device 1600 can also include a capture and recognition subsystem 1630 that facilitates the captures and processing of context data. The capture and recognition subsystem 1630 interfaces to the processor 1602, and can also interface directly to an input sensing subsystems block 1632 which can be a multi-modal system that can sense speech signals, text, images and biometrics, for example. It is to be appreciated that either/both of the capture and recognition subsystem 1630 or/and the input sensing subsystems 1632 can include individual processors to offload processing from the central processor 1602. The device 1600 can also include a physical interface subsystem 1634 that allows direct physical connection to another system (e.g., via a connector), rather than by wireless communications or cabled communications therebetween.

Figure 17:
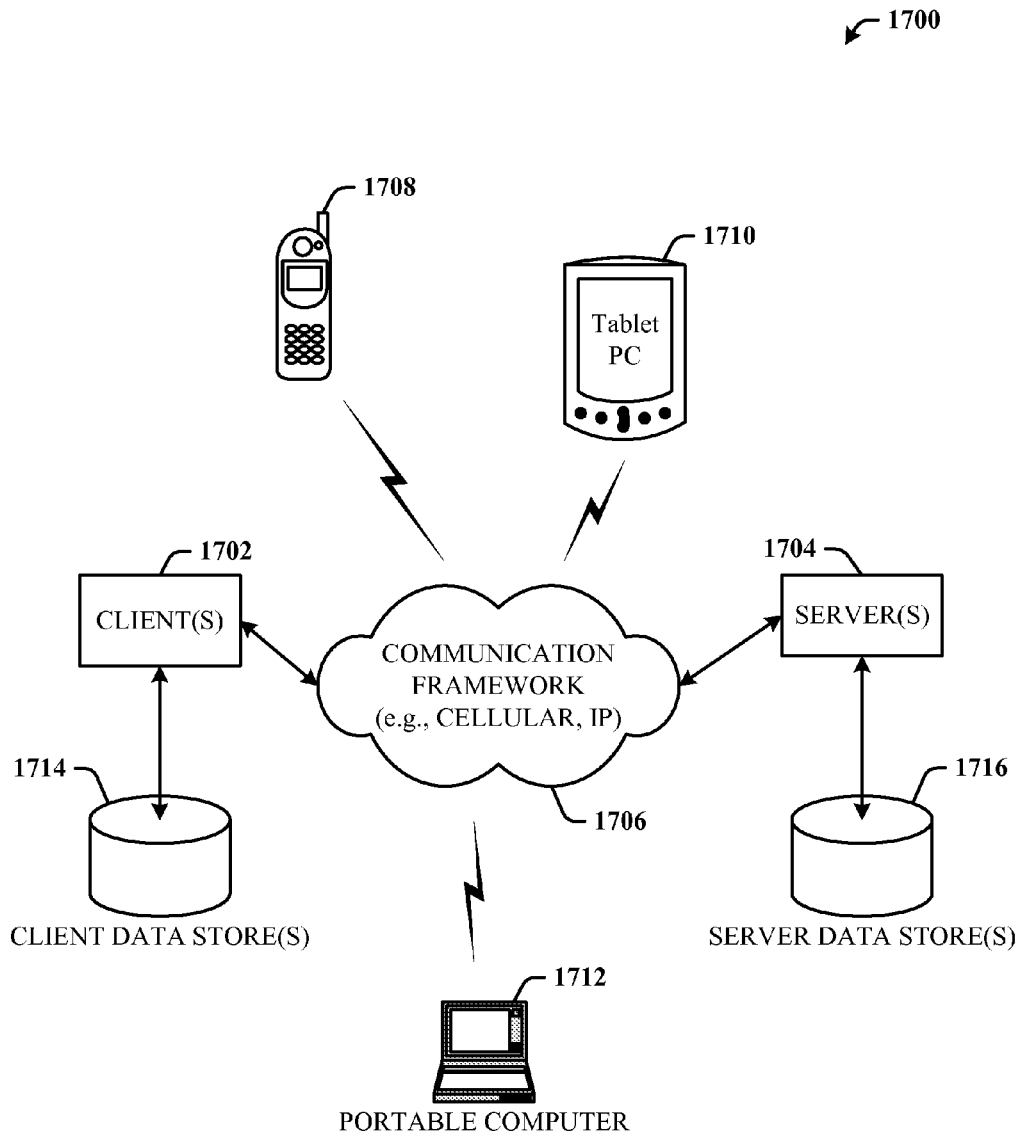
FIG. 17 illustrates a schematic block diagram of an exemplary computing environment for background searching and caching in accordance with another aspect.

Referring now to FIG. 17, there is illustrated a schematic block diagram of an exemplary computing environment 1700 for background searching and caching in accordance with another aspect. The system 1700 can include one or more client(s) 1702. The client(s) 1702 can be hardware and/or software (e.g. threads, processes, computing devices). The client(s) 1702 can house cookie(s) and/or associated contextual information by employing the subject innovation, for example.

The system 1700 also includes one or more server(s) 1704. The server(s) 1704 can also be hardware and/or software (e.g., threads, processes, computing devices). The servers 1704 can house threads to perform transformations by employing the invention, for example. One possible communication between a client 1702 and a server 1704 can be in the form of a data packet configured to be transmitted between two or more computer processes. The data packet may include a cookie and/or associated contextual information, for example.

The system 1700 includes a communication framework 1706 (e.g., a global communication network such as the Internet and/or cellular network) that can be employed to facilitate communications between the client(s) 1702 and the server(s) 1704, and one or more portable wireless devices, such as a cellular telephone 1708, a tablet PC 1710, and a portable computer 1712, for example.

Communications can be facilitated via a wired (including optical fiber) and/or wireless technology. The client(s) 1702 are operatively connected to one or more client data store(s) 1714 that can be employed to store information local to the client(s) 1702 (e.g., cookie(s) and/or associated contextual information). Similarly, the server(s) 1704 are operatively connected to one or more server data store(s) 1716 that can be employed to store information local to the servers 1704.

Accordingly, the portable wireless devices, whether tethered or untethered, can include the caching and prefetching capabilities described supra for prefetching data based at least in part on user and/or context information.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a search component implemented by a processor on a portable wireless device to perform an automated search as a background process on the portable wireless device to obtain search results;
   a content storing component, implemented on the portable wireless device, to store search content corresponding to the search results of the automated search on the portable wireless device for future access;
   a filter component to filter the search content corresponding to the search results based, at least in part, on an amount of time of user interaction with previous search results; and
   a presentation component, implemented on the portable wireless device, to present at least a subset of the stored search content.

2. The system of claim 1, wherein the search component selects the search content for download to the portable wireless device based at least in part upon a description of the search results received in response to the automated search.

3. The system of claim 1, further comprising merchant content preloaded on the portable wireless device, wherein the merchant content preloaded on the portable wireless device is presented in place of comparable search content in the search results returned by the automated search.

4. The system of claim 1, wherein:
   the portable wireless device comprises a cache memory and a mass storage memory; and the content storing component identifies a first portion of the stored search content to retain in the cache memory and a second portion of the stored search content to move from the cache memory to the mass storage based on an analysis of an expected utility of the first portion.

5. The system of claim 1, wherein:
the search component is configured to compare the search results with local content obtained by a prior search and stored on the portable wireless device;
the search component is configured to download the search content that comprises changes between the local content and the search results;
the local content is updated on the portable wireless device with the changes to provide updated content on the portable wireless device; and
the updated content is cached in the cache of the portable wireless device for presentation.

6. The system of claim 1, wherein the subset is selectively determined and presented based, at least in part, on a user context currently determined by the portable wireless device.

7. The system of claim 1, wherein filtering the search content comprises identifying search content of shorter playtime duration when a determination is made that the user is cutting short content presentation.

8. The system of claim 4, further comprising a machine learning and reasoning component that employs statistical, decision-theoretic, or logical analysis to determine when to move search content stored in the cache memory from the cache memory to the mass storage memory based at least in part on one or more of user context or user state.

9. A system comprising:
a search component implemented by a processor of a portable wireless device that performs an automated search as a background process on the portable wireless device by forming a search query based, at least in part, on a geolocation context of the portable wireless device, wherein:
the search component receives brief description information of search results corresponding to the search query of the automated search at the portable wireless device;
the brief description information comprises file type and description of the search content corresponding to the search query; and
the search component is configured to determine search content to download to the wireless device based, at least in part, upon the brief description information of the search results;
a content storing component implemented on the portable wireless device that stores the search content corresponding to the automated search for future access;
a cache memory and a mass storage memory included on the portable wireless device for storing the search content;
a filter component, implemented by the processor of the portable wireless device, to further determine the search content to download to the wireless device by filtering the search content based, at least in part, on at least one of: a search content format; a search content size; a search content resolution; or a search content play time, and further based, at least in part, on a user interaction with previous search results; and
a trigger component implemented by the processor of the portable wireless device that initiates presentation of the search content based, at least in part, on relevancy to at least one of a user state, a user preference, or a user context.

10. The system of claim 9, further comprising merchant content preloaded on the portable wireless device, wherein the merchant content preloaded on the portable wireless device is presented in place of comparable search content corresponding to the search results returned by the automated search.

11. The system of claim 9, wherein:
the search component is configured to compare the search results with local content obtained by a prior search and stored on the portable wireless device;
the search component is configured to download the search content that comprises changes between the local content and the search results;
the local content is updated on the portable wireless device with the changes to provide updated content; and
the updated content is cached in the cache of the portable wireless device for presentation.

12. A method comprising:
executing, by a processor of a portable wireless device, an automated search as a background process on the portable wireless device by forming a search query in anticipation of user interest in a subject of the automated search;
determining, by the processor, search content corresponding to the search query to download to the portable wireless device based, at least in part, on a length of time of prior user interaction with previous search content presented on the portable wireless device; and
storing the search content corresponding to the search query of the automated search on the portable wireless device for future access.

13. The method of claim 12, further comprising:
receiving brief description information of search results corresponding to the search query of the automated search at the portable wireless device, wherein the brief description information comprises file type and description of the search content corresponding to the search query; and
determining search content to download is further based, at least in part, on the brief description information of the search results of the automated search.

14. The method of claim 12, the determining further comprising analyzing the length of time of the prior user interaction with the previous search content presented on the portable wireless device to determine, at least in part, at least one of:
a search content format;
a search content size;
a search content resolution; or
a search content play time.

15. The method of claim 12, further comprising:
comparing the search results with local content obtained by a prior search and stored on the portable wireless device, wherein the search content downloaded comprises changes between the local content and the search results;
updating the local content on the portable wireless device with the changes to provide updated content; and
caching the updated content in a cache of the portable wireless device for presentation of just the updated content.

16. The method of claim 12, wherein the determining search content to download to the portable wireless device further comprises identifying a content format for downloading that differs from a previous content format based, at least in part, on the length of time of the prior user interaction with the previous search content.

17. The method of claim 12, wherein merchant content is preloaded on the portable wireless device, further comprising presenting the merchant content preloaded on the portable wireless device in place of comparable content returned by the automated search.

18. The system of claim 1, wherein the filter component further filters the search content based, at least in part, on at least one of:
- a search content format;
- a search content size;
- a search content resolution; or
- a search content play time.

19. The system of claim 9, wherein the content storing component identifies a first portion of the stored search content to retain in a cache memory and a second portion of the stored search content to move from the cache memory to a mass storage based on an analysis of an expected utility of the first portion.

20. The system of claim 6, wherein the user context is currently determined based, at least in part, on an identification of one or more software applications that a user is determined to be currently interacting with on the portable wireless device.

* * * * *